United States Patent

[11] 3,604,663

| [72] | Inventor | Willard R. Custer<br>Hagerstown, Md. |
|---|---|---|
| [21] | Appl. No. | 841,856 |
| [22] | Filed | July 15, 1969 |
| [45] | Patented | Sept. 14, 1971 |
| [73] | Assignee | Custer Channel Wing Corporation<br>Hagerstown, Md. |

[54] JET ENGINE THRUST ENHANCER
5 Claims, 5 Drawing Figs.

| [52] | U.S. Cl. | 244/53B,<br>137/15.1 |
|---|---|---|
| [51] | Int. Cl. | B64d 33/02 |
| [50] | Field of Search | 244/12, 23,<br>53–55; 60/228, 229, 230; 137/15.1, 15.2 |

[56] References Cited
UNITED STATES PATENTS

| 2,665,083 | 1/1954 | Custer | 244/12 |
|---|---|---|---|
| 2,922,277 | 1/1960 | Bertin | 244/23 |
| 3,302,396 | 2/1967 | Robbins | 244/53 |
| 2,784,551 | 3/1957 | Karlby et al. | 60/269 X |
| 2,922,277 | 1/1960 | Bertin | 60/269 X |
| 3,382,679 | 5/1968 | Spoerlein | 60/269 X |

*Primary Examiner*—Milton Buchler
*Assistant Examiner*—Steven W. Weinrieb
*Attorney*—Raphael Semmes ABSTRACT: Apparatus for enhancing jet engine efficiency and creating increased thrust, utilizing effective created pressure differentials to establish forward reaction thrust. The apparatus basically consists of a bell-shaped member disposed forward of the engine intake throat. In a modified form a partial bell-shaped member is combined with a lift channel for increased operating efficiency.

PATENTED SEP 14 1971 3,604,663

INVENTOR
WILLARD R. CUSTER

BY Raphael Semmes

ATTORNEY

JET ENGINE THRUST ENHANCER

BACKGROUND OF THE INVENTION

Jet engine users and manufacturers have in the past sought to increase available thrust in engines for various uses, particularly in, but not limited to, aircraft. Limitations are imposed by feasible engine sizes, weights, costs, structural limitations, etc. Economical and operational goals have not heretofore been attained within the existing technological knowledge.

SUMMARY OF THE INVENTION

The principal feature of the invention is to substantially increase available thrust of jet engines by means applicable to existing types of engines, without entailing unfeasible modifications or designs. The invention eliminates unacceptable cost, size, weight, structural, etc., factors. The results are obtained basically by utilizing effective pressure differentials created by and between pressure forward of the engine intake and external resultant atmospheric pressure to establish a forward reaction thrust. To this end a bell-shaped member is disposed forward of the engine and in direct communication with the engine intake throat. A modified form uses a partial bell-shaped member in combination with a lift channel for increased operating efficiency. The invention is particularly desirable for use with aircraft but is susceptible of broad application for increasing thrust obtainable with jet engines for many uses.

The foregoing and other objects and advantages will become apparent, and the invention will be better understood from the following detailed description of illustrative embodiments shown in the accompanying drawings. Various changes may be made in details of construction and arrangements of parts, and certain features may be used without others, all such modifications within the scope of the appended claims being included in the invention.

Figure 1:
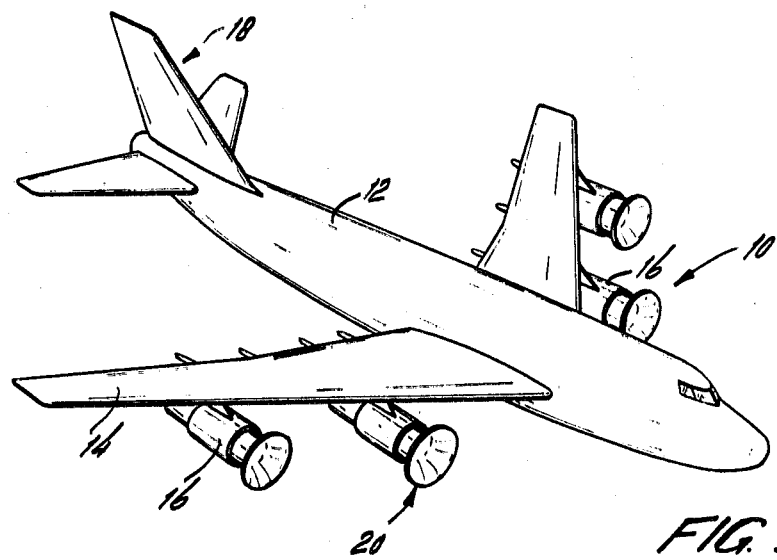
FIG. 1 is a perspective view of a jet-propelled airplane incorporating the invention.
Figure 2:
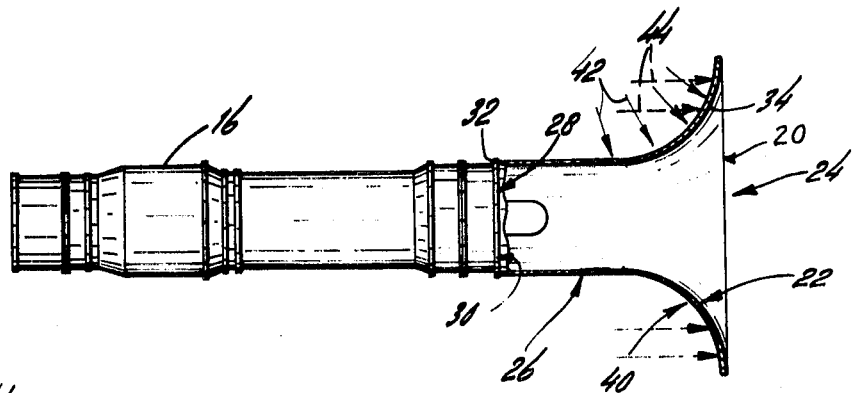
FIG. 2 is an enlarged plan view, partly in section of a jet engine incorporating the invention.
Figure 3:
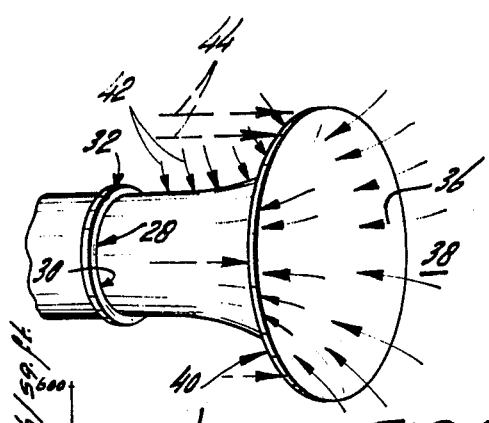
FIG. 3 is a perspective view of one form of a thrust enhancer with fluid flow schematically indicated.

Referring now in more detail to the drawings wherein like parts have like numbers, there is shown apparatus incorporating the principles of the invention in preferred forms, as used in connection with aircraft. The use with aircraft as shown is illustrative only of a particularly suitable application, it being understood that the principles have broad application for increasing available jet engine thrust.

The airplane, generally designated 10, is of a known standard type including fuselage 12, wings 14, jet engines 16 mounted below the wings and empennage 18. One form of the invention is generally indicated at 20, applied to each of engines 16, and broadly consists of a bell-shaped member including a flared curvilinear shaped front portion 22 having an open mouth or throat 24 which merges or tapers into a cylindrical rear portion 26. The open rear or discharge end 28 is juxtaposed to and is in open communication with the intake throat 30 of the jet engine. Member 20 can be attached to the engine in any desired manner such as, for example, mating flanges or the like.

The front portion interiorly is generally of a streamlined horn shape as at 34 and serves to gradually and smoothly guide and constrict air flow, indicated by arrows 36, from the frontal exterior 38 into and through cylindrical portion 26 and thence exhausted into engine throat 30. The air introduced to the engine is thereby compressed to increase operating efficiency. The described operation occurs when the jet engine is running and variations in power settings will vary intake speed of the air.

Of importance in the invention is a created effective difference in air pressures acting on the exterior horn flange portion 40 of member 20 and aft of mouth 24. This is indicated by arrows 42. The intake air velocities from frontal area 38 into and through member 20 (arrows 36) vary according to engine speed and forward speed thereof. Depending upon such speeds a negative or low pressure is created by the induced air flow from in front of and over the interior horn portion 34. This created negative pressure results in an effective pressure differential between the interior of member 20 and the exterior atmospheric pressure and establishes a resultant positive forward thrust on the exterior rear horn flange portion 40 as indicated by thrust arrows 44. This created positive thrust serves to assist the normal engine thrust on takeoff of an airplane for example.

Figure 5:
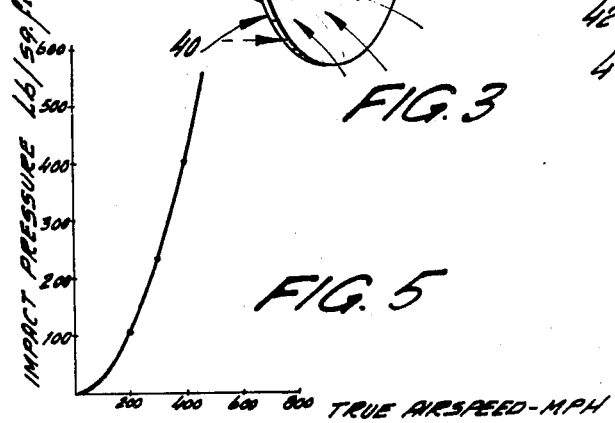
FIG. 5 is a chart depicting air-impact pressures related to airspeed.

The pressure differential created, and resultant positive forward thrust, are dependent upon engine and forward speed thereof, this existing at zero forward speed, and increasing according to engine operating speed and forward movement, with increased induced air velocities into member 20. The created positive or reaction thrust as a function of resultant effective atmospheric pressure on the exterior horn portion 40 is evident from the chart of FIG. 5 where pressures in pounds per square foot are graphed versus true airspeed in miles per hour. The reaction thrust varies, as examples only, approximately as follows: (Sea level).

Effective atmospheric pressure approximate 25 pounds per square foot when induced intake speed of air reaches 100 m.p.h. into engine throat and 100 lbs. at 200 m.p.h.
400 lbs. at 400 m.p.h.

Figure 4:
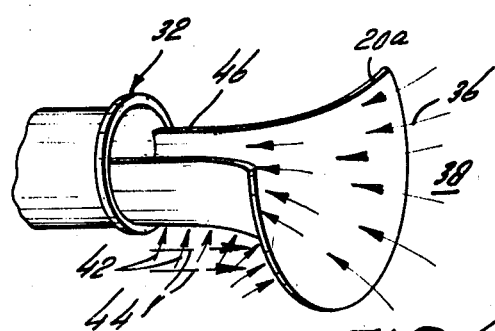
FIG. 4 is a view similar to FIG. 3 of a modified form of the invention.

FIG. 4 shows a modification which uses a bell portion 20a, open at the top and mated with an upwardly open lift channel 46. The operation of the two embodiments are substantially the same but a lift increase is obtained in a manner set forth in a number of my prior U.S. Pats. such as Nos. 2,510,959 and 2,611,555, for example. Enhanced flow characteristics are obtained which are also of benefit in this invention. The channel can be flat or airfoil shaped in cross section, as desired, to afford selected lift and operational characteristics.

It is to be clearly understood, as previously indicated, that it is contemplated that where the invention is used with one or more jet engines on jet aircraft, it can be used with the jet engines wherever the engines are located on the aircraft, for example on the top of the wings, in or on the fuselage (front, top, bottom, rear end, or sides) near the empennage and above or as part of the dorsal fin.

Functioning and operation of the invention will be readily understood by those skilled in the art from the foregoing, and further explanation herein is not considered necessary.

Manifestly, changes in details of construction can be effected in the shown and described embodiments without departing from the spirit and scope of the invention as defined in and limited solely by the appended claims.

1. A thrust enhancer for use in conjunction with the air intake of a jet engine for increasing effective thrust of the engine, comprising an internally unrestricted bell-shaped member mounted positionally forward of the intake of said engine, said member having a forward open end flared portion with an outer diameter substantially greater than the greatest diameter of said engine or the inlet thereof and a cylindrical rear portion of constant diameter, the diameter being the same as the diameter of the engine inlet, and into which said flared portion exhausts and which in turn exhausts into said engine inlet, induced air velocity into said open-flared portion and over the inner front surface of said bell-shaped member creating a zone of negative pressure on the front surface of the flared portion as compared with effective atmospheric pressure on the rear surface with a resultant imparted forward reaction thrust of atmospheric pressure on the rear surface and thereby to the engine.

2. A thrust enhancer as claimed in claim 1, said bell-shaped member including a front, open-faced, streamlined air scoop portion merging into said cylindrical rear portion.

3. Apparatus as claimed in claim 1, said bell-shaped member having a rear upwardly open channel portion, said flared portion opening upwardly, said channel and flared portions merging and mating to form a composite lift channel.

4. Apparatus as claimed in claim 3, said channel portion being airfoil shaped in cross section.

5. Apparatus as claimed in claim 3, said channel and said flared portions being airfoil shaped in cross section.